(12) United States Patent
Collard et al.

(10) Patent No.: US 7,296,136 B1
(45) Date of Patent: Nov. 13, 2007

(54) METHODS AND SYSTEMS FOR LOADING DATA FROM MEMORY

(75) Inventors: Jean-Francois Collard, Sunnyvale, CA (US); Robert Samuel Schreiber, Palo Alto, CA (US); Michael S. Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 10/861,710

(22) Filed: Jun. 4, 2004

(51) Int. Cl.
 *G06F 9/26* (2006.01)
 *G06F 9/34* (2006.01)
 *G06F 12/00* (2006.01)
(52) U.S. Cl. .................. 711/203; 711/205; 711/206; 711/207; 711/208; 711/209; 711/220
(58) Field of Classification Search ................ 711/203, 711/205, 206, 207, 208, 209, 220
See application file for complete search history.

(56) References Cited

U.S. PATENT DOCUMENTS

| 5,530,838 | A  | * | 6/1996 | Hisano ........................ 711/151 |
| 5,652,858 | A  | * | 7/1997 | Okada et al. ................ 711/137 |
| 6,226,733 | B1 | * | 5/2001 | Belgard ........................ 711/213 |
| 6,792,521 | B2 | * | 9/2004 | Arimilli et al. .............. 711/203 |
| 7,024,463 | B1 | * | 4/2006 | Hitomi et al. ............... 709/214 |
| 2004/0044872 | A1 | * | 3/2004 | Scott ........................... 711/202 |

* cited by examiner

*Primary Examiner*—Sanjiv Shah
*Assistant Examiner*—Yaima Campos

(57) ABSTRACT

According to an exemplary embodiment of the present invention, a method for loading data from at least one memory device includes the steps of loading a first value from a first memory location of the at least one memory device, determining a second memory location based on the first value and loading a second value from the second memory location of the at least one memory device, wherein the step of loading a first value is performed by a first processing unit and wherein the steps of determining a second memory location and loading a second value are performed by at least one other processing unit.

23 Claims, 9 Drawing Sheets

METHODS AND SYSTEMS FOR LOADING DATA FROM MEMORY

BACKGROUND

The present invention relates generally to data processing systems and methods and, more particularly, to systems and methods for loading data from memory.

Microprocessors, including general purpose microprocessors and digital signal processors (DSPs), are ubiquitous in today's society. Many different types of products incorporate microprocessors, including personal computers, toys and cars just to name a few. At a fundamental level, microprocessors perform functions by executing instructions. The set of instructions which a particular microprocessor is designed to respond to is called its instruction set. Microprocessor instruction sets include commands to the microprocessor to, e.g., load values in registers, store values from registers to locations in main memory, add, subtract, multiply or divide values stored in registers or other storage locations, compare shift register contents and perform a variety of control operations, including testing and setting bits, outputting data to a port, pushing data to a stack and popping stack contents. Microprocessor instructions are typically expressed in mnemonic form. For example, one common microprocessor instruction is ADD, which is the mnemonic for an addition operation, for example, to add the contents of one register to the contents of another register and place the result in an accumulator or other register.

Another common microprocessor instruction is the load operation, the mnemonic for which is typically LOAD, which instructs the microprocessor to load data from a memory device, e.g., a cache memory. Of particular interest for the present discussion are so-called "indirect loads" wherein a first load instruction is used to obtain an address (or a value used to create an address) for a second load instruction. Indirect loads can be written in programs as, for example:

load b=[a]
    add c=b+d
    load v=[c]

where a and c are addresses, b and v are registers, and d is an integer that serves as an offset or displacement from base address b. The displacement may be zero, in which case the add instruction is not needed. Executing this program code results in the value at virtual address a being loaded into register b, that value being added to value d to create c, which in turn is used as a new address that is accessed to load register v. A more detailed discussion of conventional indirect loads is provided below with respect to FIG. 1. However, what is significant to note initially is that indirect loads may take a long time to execute, particularly if the addresses being accessed are not currently stored in a cache.

Indirect loads occur in programs for several reasons, including reference to a piece of data v through a structure, in which case 'a' is the address of a pointer to the structure that contains different fields. The field of interest in this example is located d bytes after the beginning of the structure, and is itself a pointer to v. Another source of indirect loads in programs is linkage tables (also known as "global offset tables"). Data accessed through linkage tables require two loads, one to the linkage table off the global pointer register and one to the address returned by the first load. In addition, the two issues can be compounded, that is, a program may need to access data through a structure that itself needs to be accessed through a linkage table. The impact on memory traffic, and therefore performance, is significant because at least two loads are needed where as few as one is needed conceptually. In addition, these access patterns usually have little locality. For instance, distant entries in the linkage table are often needed at the same time, which means that the two linkage table offsets are large enough for the two entries not to sit in the same line at any cache level. This implies additional latency associated with fetching at least some of the information needed to complete the indirect load from main memory.

Accordingly, it would be desirable to provide techniques and devices which avoid latency associated with indirect loads.

SUMMARY

Systems and methods according to the present invention provide techniques which load data from memory in a way which can reduce latency associated with indirect loads. At least some of the sub-steps associated with an indirect load can be performed by a processing unit (e.g., a logic unit, an agent or the like) which is closer to the memory unit(s) associated with the load operations than the unit which is executing the indirect load sequence. In this context, "closer" refers to, for example, roundtrip communication time. By handling aspects of the indirect load sequence locally relative to the memory unit(s), latency and/or signaling can be reduced.

According to an exemplary embodiment of the present invention, a method for loading data from at least one memory device includes the steps of loading a first value from a first memory location of the at least one memory device, determining a second memory location based on the first value and loading a second value from the second memory location of the at least one memory device, wherein the step of loading a first value is performed by a first processing unit and wherein the steps of determining a second memory location and loading a second value are performed by at least one other processing unit.

According to another exemplary embodiment of the present invention, a system includes a processor for executing instructions, a memory device; and a logic unit for performing an indirect load between said processor and said memory unit.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
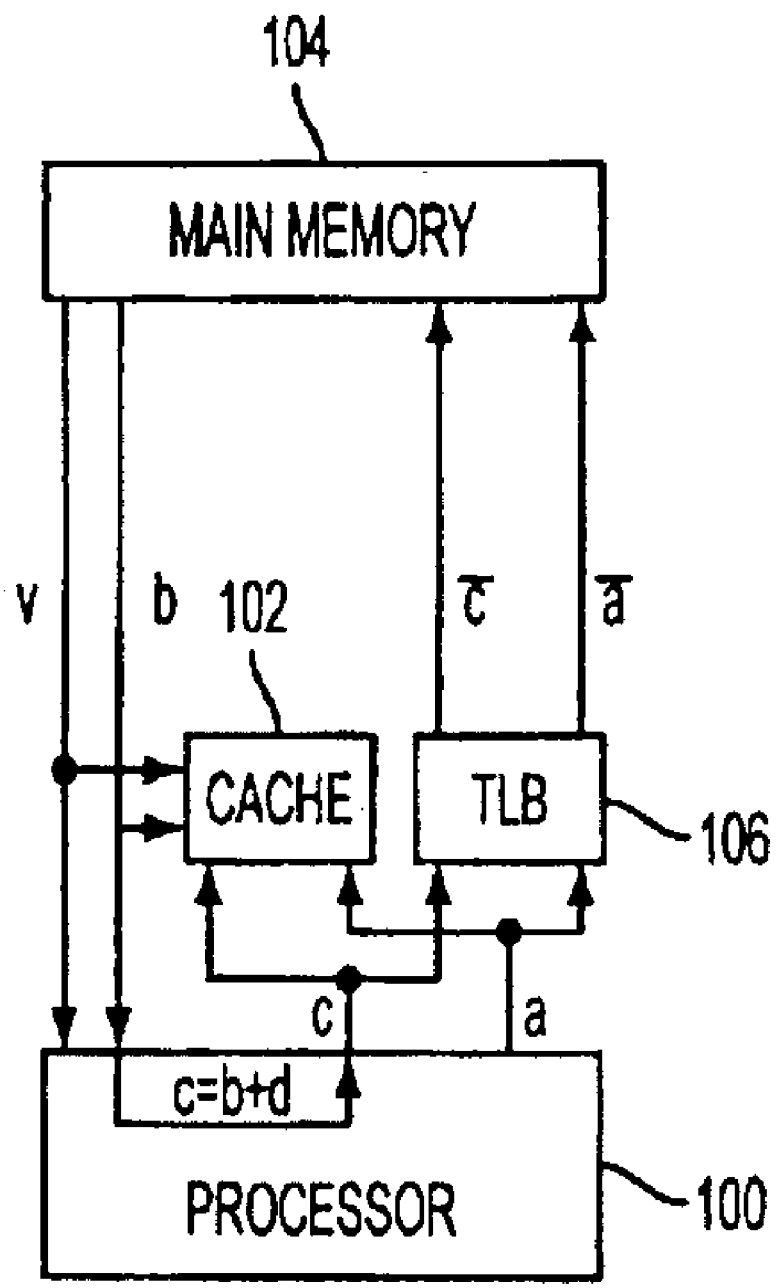
FIG. 1 depicts a conventional memory hierarchy.

To better understand the latency issues associated with conventional handling of indirect loads, FIG. 1 provides an example of a conventional memory architecture. A processor 100 obtains data from a cache memory device 102 and/or main memory 104. A translation lookaside buffer (TLB) 106 may translate virtual addresses coming from the processor 100 into physical addresses usable to address main memory 104. In addition to, or as an alternative to TLBs, processor 100 may use specialized hardware to read a page table stored in memory to perform this translation. Note that in this specification physical addresses are denoted by a bar over a letter (e.g., $\bar{a}$) or by corresponding text (e.g., 'abar') whereas virtual addresses are denoted by the same letter without a bar.

Figure 2:
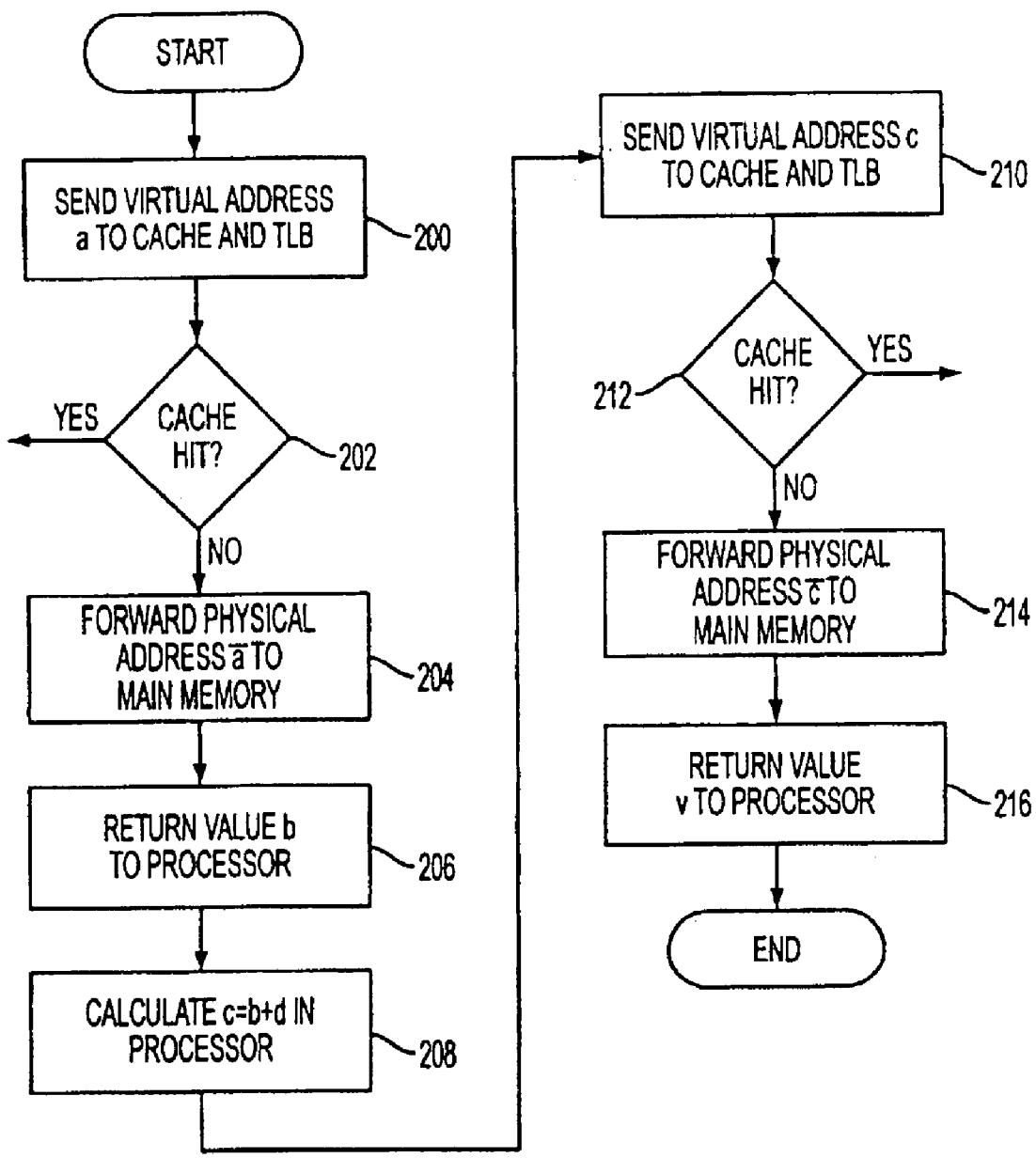
FIG. 2 is a flowchart illustrating operation of the conventional hierarchy of FIG. 1 performing an indirect load.

An indirect load can be performed within the conventional memory architecture of FIG. 1 as shown in the flowchart of FIG. 2 and the arrows between blocks in FIG. 1. Note that in this example, it is assumed that each of the load requests result in cache misses, since this scenario results in the greatest latency for an indirect load. Therein, when executing the exemplary code portion described above in the Background section, the process begins with the processor 100 executing the instruction load b=[a]. Thus, at step 200, the processor 100 sends virtual address a to the cache memory device 102 and the TLB 106. The cache look-up, whether the cache is a level one (L1), level two (L2) or level three (L3) cache, begins before the TLB look-up is complete. The process flow for a cache hit is not illustrated since the cache miss case is the higher latency case.

If the load request misses all cache levels at step 202, the physical address abar is sent to memory device 102 (step 204) and the content b stored at physical address abar fills the cache memory device 102 and is copied into a register of processor 100 at step 206. Once the processor 100 receives b, the processor 100 computes virtual address c=b+d at step 208 and then makes a second request to memory by executing the instruction load v=[c]. If address c misses the cache memory device 102, the request is again sent all the way to main memory 104 to obtain the desired data v (steps 212 and 214). The case of a cache hit for address c is not further described here. The desired data v is copied into the cache memory unit 102 and stored in a register of processor 100 at step 216.

One problem associated with the conventional indirect load discussed above with respect to FIGS. 1 and 2 is the latency associated with making two requests to main memory. Omitting the signaling associated with cache memory device 102 and TLB 106 for simplicity, if cache misses occur for both loads, an indirect load essentially requires two round trip communications between processor 100 and main memory 104.

Figure 3:
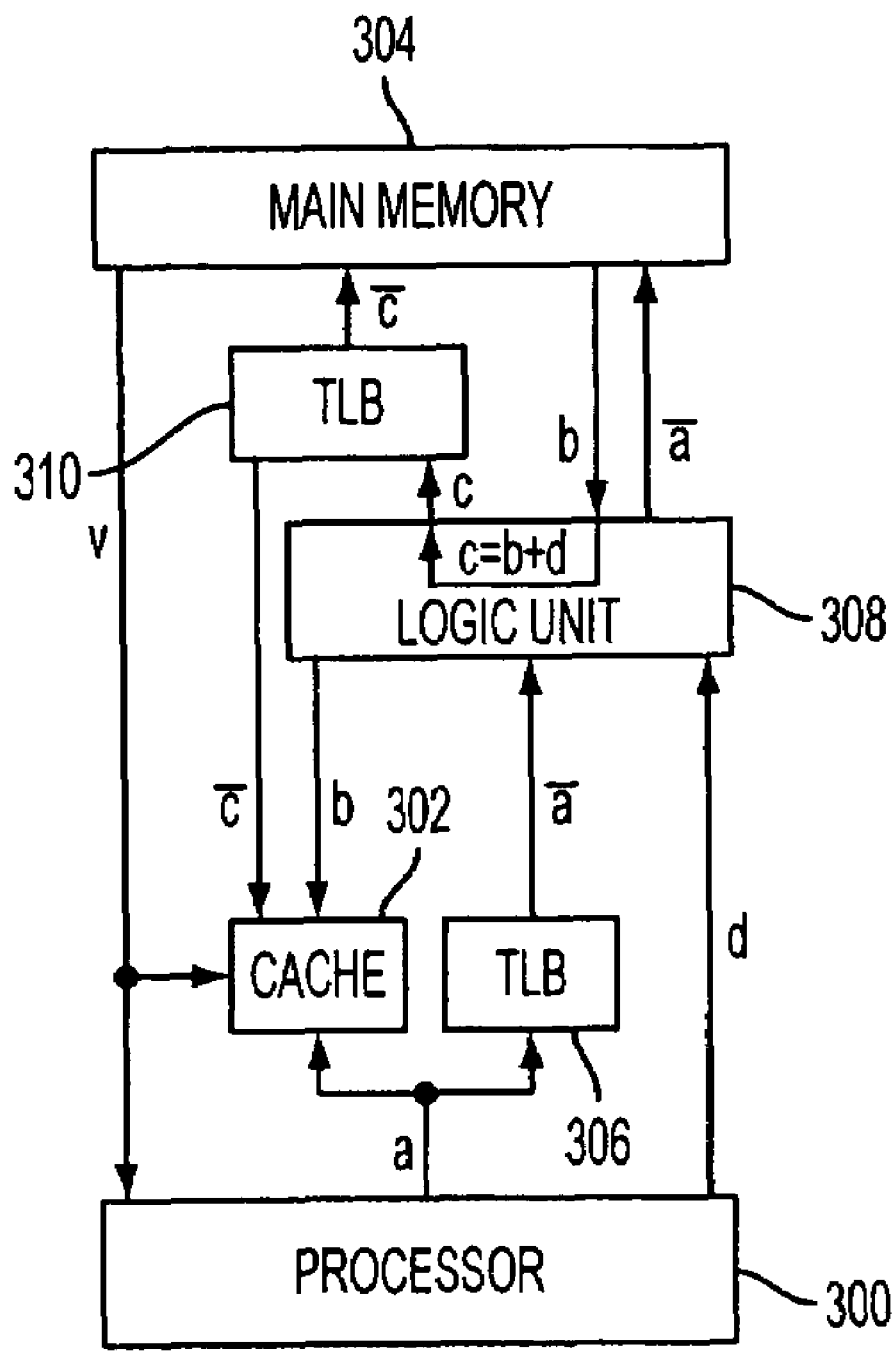
FIG. 3 depicts a memory hierarchy according to an exemplary embodiment of the present invention.

This problem is addressed by techniques and systems according to the present invention, an example of which is shown in FIG. 3. Therein, a hierarchy is illustrated according to an exemplary embodiment of the present invention including processor 300, cache memory device 302, main memory 304, TLBs 306 and 310 and logic unit 308. Physically, the logic unit 308 may be disposed in the memory device 304, on a chip which also includes the processor 300, or on an independent chip disposed between the processor 300 and the main memory 304. Conceptually, the logic unit 308 can be considered to be located in a memory controller or, in a shared-memory multiprocessor, in a cell or node controller.

Figure 4:
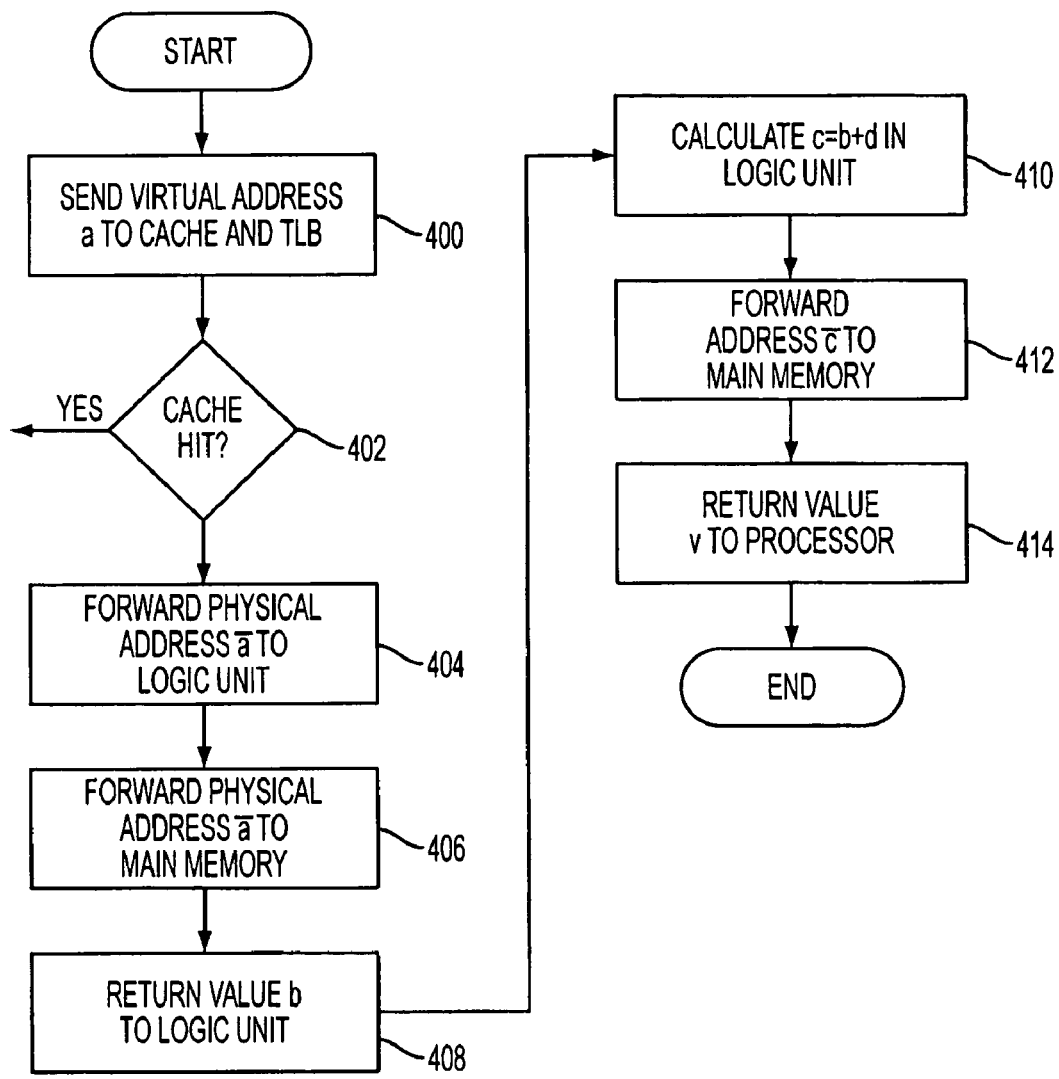
FIG. 4 is a flowchart illustrating operation of the hierarchy of FIG. 3 performing an indirect load according to an exemplary embodiment of the present invention.

The flowchart of FIG. 4 illustrates how an indirect load can be performed using the architecture of FIG. 3. Therein, at step 400, virtual address a is sent to the cache memory device 302 and TLB 306 by processor 300. If a cache hit occurs, then the flow follows the 'Yes' branch from decision step 402, in which case different courses of action may be taken which are not illustrated in FIG. 4. For example, one possible action is to abort the process described in FIG. 4 and to instead perform a conventional indirect load sequence. Another possible course of action when a cache hit occurs is to have the cache memory 302 forward value b to the logic unit 308. Logic unit 308 can then proceed directly to step 410.

If, on the other hand, a cache miss occurs at step 402, then the physical address abar is forwarded from the TLB 306 to logic unit 308 at step 404. The value d (if any) is also forwarded to the logic unit 308 for the upcoming addition operation. As will be described in more detail herein, logic unit 308 acts as an agent for processor 300 by performing certain activities associated with the indirect load more locally relative to main memory 304. Among other things, this reduces the latency associated with indirect loads involving cache misses. The logic unit 308 forwards the physical address abar to main memory 304 at step 406. The main memory 304 returns value b to the logic unit 308 at step 408 to load a first value b from a first memory location abar.

The logic unit 308 may optionally forward value b to the cache memory device 302 for storage, however since this step is not required in order to complete the indirect load operation it may be omitted or performed asynchronously relative to the rest of the process. The logic unit 308 then performs the addition of c=b+d at step 410, which determines a second memory location c, and forwards the resulting value c to main memory 304 at step 412. A second TLB 310 may optionally be included to translate the value c into a physical address. Alternatively, the TLB 310 may be omitted and the logic unit 308 may instead access the page table (not shown) in main memory 304. In either case, main memory 304 then returns value v to the processor 300 (and stores that same value in the cache memory device 302) at step 414, to thereby load a second value v from the second memory location c.

Many variations and modifications of systems and methods for performing indirect loads according to the present invention are contemplated by the exemplary embodiments described herein. For example, the manner in which cache memory interacts with the indirect load process can vary. In one variation when the cache is write-through, the initial step of checking the cache memory device 402 can be omitted completely and all indirect loads can be handled via the logic unit 308. Alternatively, all cache levels can be looked up and if any cache level results in a hit, then the request sent to the logic unit 308 can be cancelled. Still yet another variation is to check only level one (L1) and/or level two (L2) of the cache memory device 302 and to proceed to step 404 if the result is a cache miss, or to step 410 if the result is a hit.

Implementation of indirect load handling according to exemplary embodiments of the present invention may involve also modifications based on the type of hardware used in the hierarchy. For write-back cache mechanisms, cache coherency techniques can be employed to ensure that an obsolete value of v is not returned from main memory 304, e.g., if the current value of v is still sitting in the cache memory device 302. For example, before the logic unit 308 queries main memory 304, it can send a signal to the cache memory device 302 to copy back "dirty" cache lines so that the main memory 304 is up to date prior to receiving the request for value v. Alternatively, upon reception of the signal from logic unit 308, the cache memory device 302 may pass value v directly to unit 308. In yet another alternative, cache memory device 302 directly forwards v to processor 300. In this latter scenario, those skilled in the art will appreciate that the tag of the originating instruction may need to be circulated between processor 300, logic unit 308 and cache memory device 302. Another consistency issue may appear when the indirect load sequence of program instructions is followed by a store instruction. For cases where the program compiler cannot determine whether the second load in the indirect load sequence aliases the store instruction, it may be necessary to delay execution of the store instruction.

As will be appreciated based on the foregoing, techniques according to the present invention place a logic unit between the processor and main memory unit to provide locality for the intermediary steps involved in an indirect load, i.e., obtaining value b, performing the addition (if any) and accessing address c in main memory. Techniques according to the present invention are globally referred to herein as "load squared" operations to distinguish them from the conventional techniques illustrated in FIGS. 1 and 2. Load squared operations will significantly reduce latency for indirect load operations for the case where both load instructions involved in the indirect load result in a cache miss. This reduction in latency for load squared operations according to the present invention can result in significant improvements in program execution time. For indirect loads involving one cache miss and one cache hit, performance (in terms of latency) of load squared techniques and conventional techniques is expected to be substantially similar. If both load operations result in a cache hit, then the performance (in terms of latency) of the conventional technique may exceed that of the load squared operation.

Figure 5:
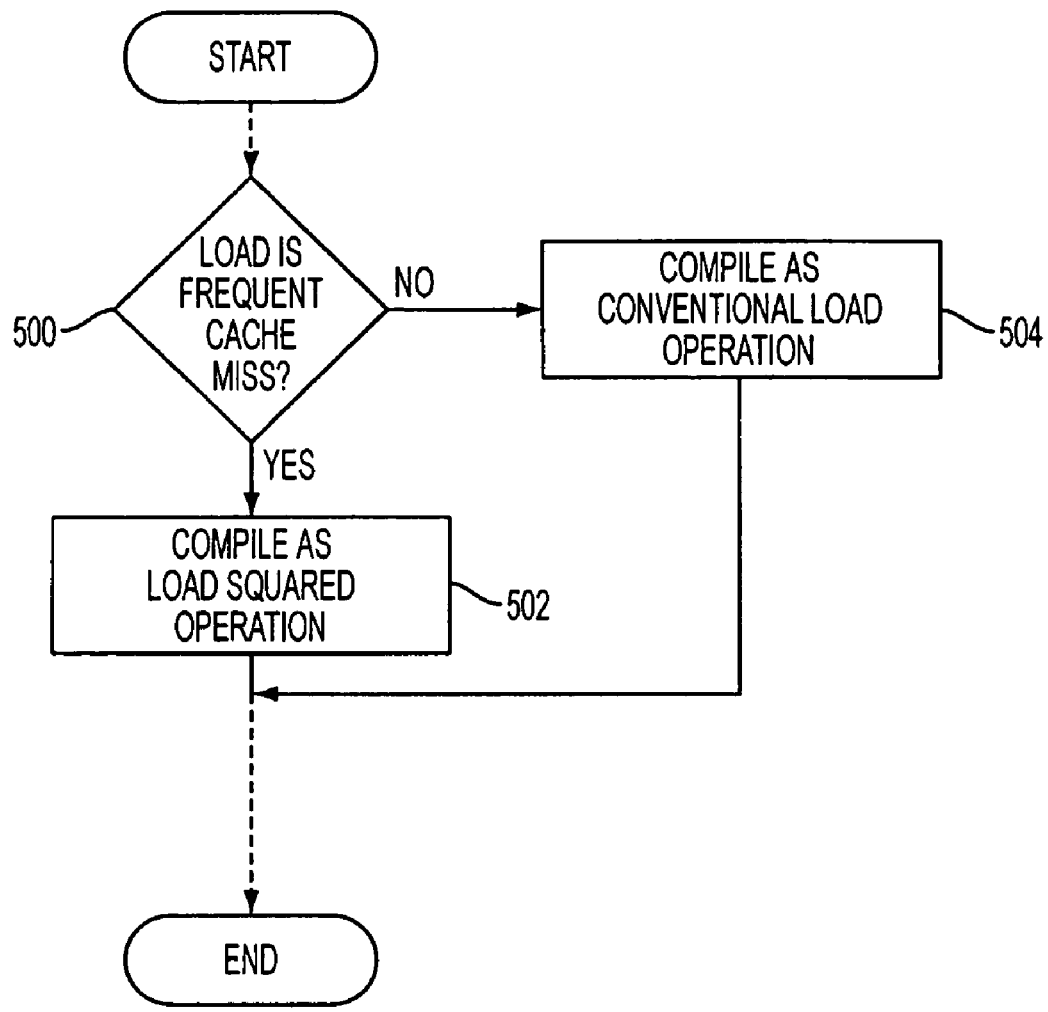
FIG. 5 is a flowchart illustrating a method of loading data according to another exemplary embodiment of the present invention.

Accordingly, another aspect of the present invention is to selectively use load squared techniques where cache misses occur (or are expected to occur) and to use conventional indirect load techniques where cache hits occur (or are expected to occur) as shown in FIG. 5. Compiler guidance tools can be used to accomplish this optimization. Binary source files can be annotated with source-level information that informs a compiler at step 500 that a specific load instruction results in a frequent cache miss, e.g., because it needed to access a linkage table. The compiler can then use this information to implement that particular load instruction as a load squared instruction in accordance with the present invention at step 502. Other load instructions, which have been determined to result frequently in cache hits, may instead be implemented by a compiler using the conventional techniques of FIGS. 1 and 2 at step 504. In addition to reducing latency, exemplary embodiments of the present invention may also provide energy savings. For example, since driving data off chip adds significantly to energy consumption, avoiding the round trip of the second address back to the processor can yield energy savings.

Actual implementation of load squared techniques from an architectural perspective according to the present invention may be accomplished in a number of different ways. One way is to implement an explicit architecture change by adding a load squared instruction to the instruction set recognized by the processor 300. In one exemplary embodiment, a load squared instruction may be decomposed into more elementary micro-instructions: an initial load squared micro-instruction coupled with an auxiliary load micro-instruction which operates conditionally based upon cache hit/miss status. For example, if the initial load associated with the micro-instruction load squared misses at all cache levels, then the auxiliary load is canceled and the load squared instruction proceeds. If, on the other hand, the initial load associated with the micro-instruction load squared instruction hits the cache, then the resulting value can be passed to the auxiliary load micro-instruction and the load squared can be canceled. Alternatively, it may be desirable to implement load squared functionality without an architectural change to the processing system, i.e., without a user-visible load squared instruction and without the need for an explicit load squared instruction in the program text. For such cases, the hardware can determine on-the-fly that a given sequence of two load instructions constitutes an indirect load and can then substitute a load squared operation. In one exemplary embodiment, the first load instruction in the indirect load sequence is left unmodified, and the second load instruction is replaced by a load squared instruction. This results in two requests at target address abar, but has the benefit of ensuring correctness if it cannot be determined, at the time of the instruction substitution, that no other instruction needs result b of the first load.

Figure 6:
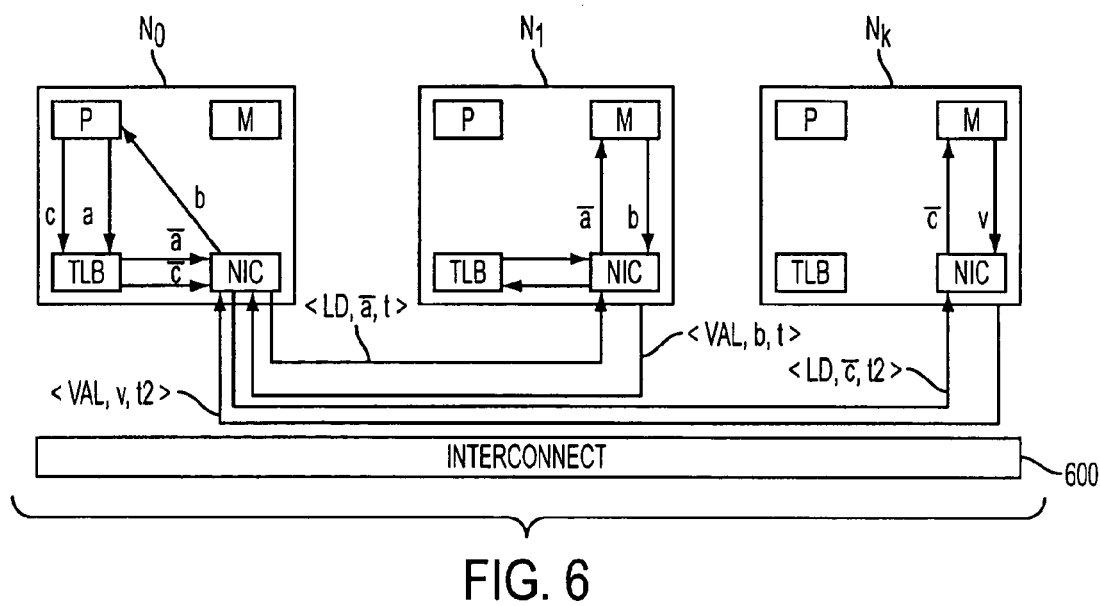
FIG. 6 depicts a conventional multiprocessor system performing an indirect load by transactions which use physical addresses.

Yet another application for techniques and systems according to the present invention occurs in multiprocessor systems. For example, load squared techniques may also provide a significant performance improvement in shared-memory multiprocessor systems, and in particular in Non-Uniform Memory Access (NUMA) multiprocessors, wherein some regions of memory are accessed via different busses than other regions of memory. NUMA systems can be described as a plurality of nodes N0, N1 . . . Nk, linked together via an interconnect device 600 as shown in FIG. 6. Each node N0, N1 . . . Nk includes, in this example, a processor P, memory unit M, TLB and network interface controller (NIC). Alternatively, the TLBs could be implemented as a shared unit.

In FIG. 6, the conventional signaling associated with an indirect load initiated by node N0 for a NUMA system using physical addressing is shown. Therein, the processor P in node N0 (executing load b=[a]) forwards virtual address a to the TLB where it is converted to physical address abar. Given the distributed nature of memory in NUMA systems, the load request may be directed to the local memory device M or to the memory device M associated with a different node. In this example, the owner of the physical address abar is node N1. The owner of a given address can, for example, be determined by high-order bits of the address or by an address translation table (e.g., as described in the IEEE SCI standard). Accordingly, the TLB of node N0 sends physical address abar to node N0's NIC where it is forwarded to the NIC of node N1 via interconnect 600. Each transaction between nodes in FIG. 6 is denoted using a similar notation: <command, value, tag>, wherein command is either LD (load) or VAL (loaded value), value is either a physical address or a value being returned from a physical address and tag is a unique identifier associated with the transaction. Thus, the forwarding of physical address $\bar{a}$ from the NIC of node N0 to the NIC of node N1 is labeled as <LD, abar, t>.

Within node N1, the NIC sends the physical address abar to memory unit M, which returns value b. The value b is then returned to node N0 (as indicated by arrow <VAL, b, t>) using the same tag t so that node N0 recognizes the return signal as the response to the first load instruction that it initiated. Value b is forwarded to processor P in node N0 wherein the addition instruction c=b+d is performed. The resulting value is forwarded back to the TLB in node N0 wherein it is translated into a physical address, forwarded to the NIC of node N0, which in turn forwards a load command to the owner of physical address (in this example node Nk) using a different tag value (t2). Within node Nk, the NIC forwards physical address cbar to the memory unit which returns value v. Value v is returned as denoted by <VAL, v, t2> to node N0 using the tag t2 to indicate to the processor P that it is the response to the second load instruction of the indirect load.

Figure 7:
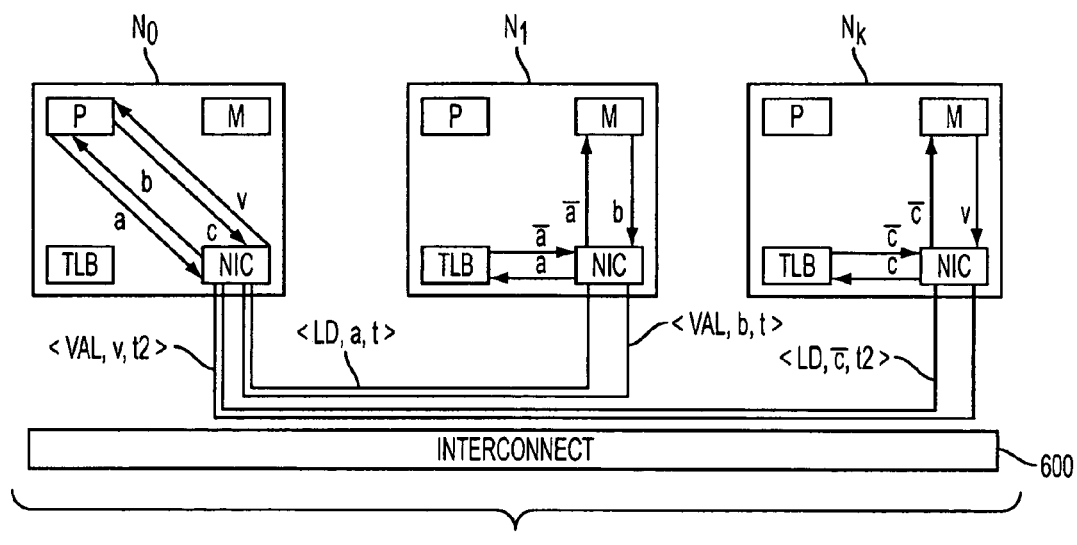
FIG. 7 depicts a conventional multiprocessor system performing an indirect load by transactions which use virtual addresses.

FIG. 7 illustrates a similar case wherein virtual addresses are transferred via interconnect 600. Thus, translation of the virtual addresses occurs within each node being sent a load instruction rather than in the requesting node.

Figure 8:
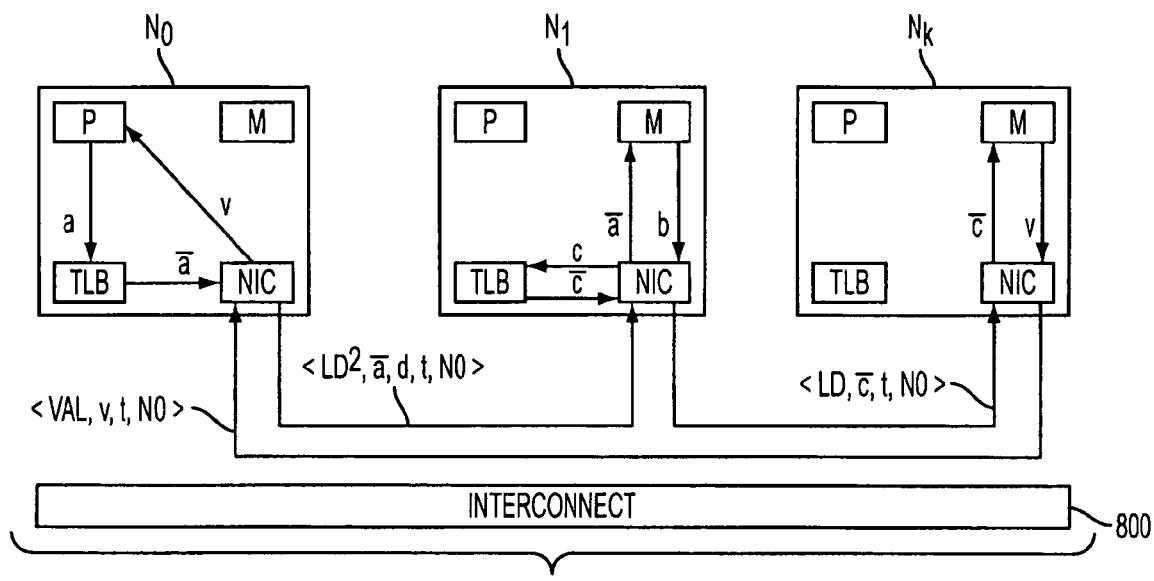
FIG. 8 illustrates a multiprocessor system performing an indirect load by transactions which use physical addresses according to an exemplary embodiment of the present invention.

FIG. 8 depicts an exemplary embodiment of the present invention wherein load squared techniques are employed to handle the indirect load in a NUMA system transferring virtual addresses via interconnect 800. Therein, processor P in node N0 sends a to the TLB for translation into physical address abar. The TLB in node N0 forwards a to the NIC wherein it is forwarded to node N1 via interconnect 800 as denoted by the arrow <$LD^2$, abar, d, t, N0>. This signal includes a command ($LD^2$), the value abar, the value d, the tag value t and the identity of the originating node (N0).

Note that since the load squared operation permits nodes other than the originating node to forward instructions associated with the load squared operation, information which identifies the originating node can also be included in the signaling so that return values can be sent to the correct node. Additionally, the value d is forwarded in this signal since another node (node N1 in this example) may perform the addition operation. The NIC associated with node N1 receives the load squared command and interprets it as a command to obtain $\bar{a}$ and use that value to obtain b from its memory M. Node N1 then performs the addition operation c=b+d and translates c into cbar using its TLB. The addition operation can, for example, be performed by node N1's processor P or NIC. The physical address cbar is determined to be owned by node Nk (in this example) and, therefore, is forwarded to node Nk in the signal denoted <LD, cbar, t, N0>. This latter signal is a load command, rather than a load squared command since it is the second part of the indirect load. The NIC of node Nk receives cbar and uses it to access its memory unit M. This yields the value v which is then returned to the node which originated the load squared command, node N0.

As with previous exemplary embodiments of the present invention, the exemplary embodiment of FIG. 8 can provide significant performance improvement. Note, for example, that only three messages are transferred to perform an indirect load in the exemplary embodiment of FIG. 8 as compared with four messages in the conventional technique described in FIG. 6. The performance improvement will vary depending upon the ownership of the locations in memory being accessed as part of the indirect load. For example, in the case where cbar is owned by node N0, node N1 will send node N0's NIC a request to load cbar and to provide the result to the pending load squared operation. According to another aspect of the present invention, therefore, knowledge of the ownership of the various memory locations being accessed by the indirect load sequence can be used to selectively employ load squared techniques in multiprocessor applications.

Figure 9:
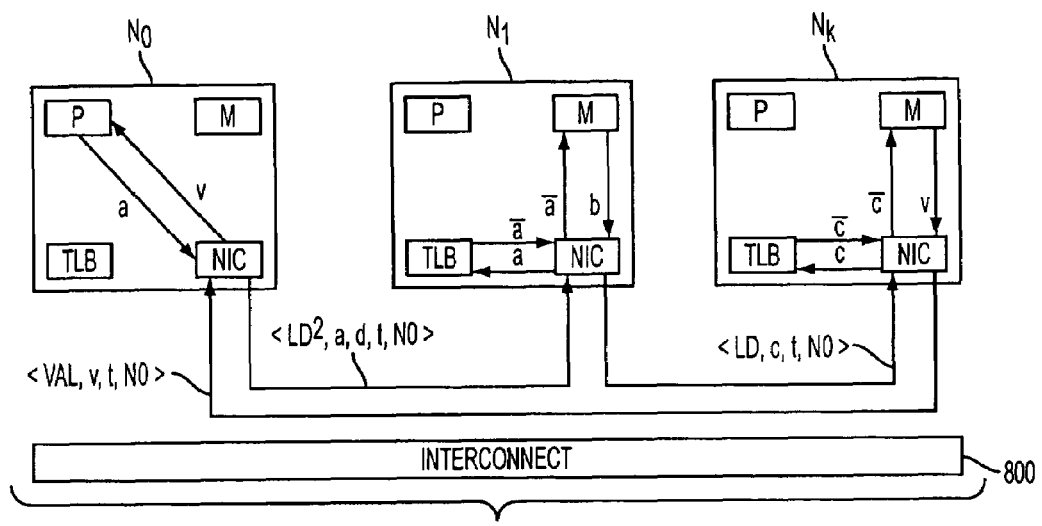
FIG. 9 illustrates a multiprocessor system performing an indirect load by transactions which use virtual addresses according to an exemplary embodiment of the present invention.

An exemplary embodiment of the present invention wherein virtual addresses are transferred via the interconnect 800 is provided as FIG. 9. Again, signaling is reduced for the illustrated case where the indirect load accesses memory locations associated with different nodes, although other cases will also yield performance improvement.

Although the present invention can provide significant performance improvement to shared-memory multiprocessor systems, it is not limited thereto. Other types of multiprocessor systems can also benefit from application of the techniques described herein. For example, distributed-memory multiprocessor systems do not offer global shared memory, i.e., each processor can only load from and store into its own local memory. In such systems, accessing other nodes' memory devices is accomplished using GET operations. Accordingly, exemplary embodiments of the present invention can also provide "get squared" functionality similar to that of the load squared described above.

Using the same indirect load example as described above with respect to FIG. 8, and referring to an exemplary interconnect system known as the Quadrics Elan interconnect by Quadrics Corp., consider the following exemplary embodiment of the present invention. Instead of calling a GET procedure twice, node N0 calls GETSQRD once. GETSQRD calls elan3_runthread on the Quadrics card of the sender node N1, e.g., using the event mechanism of the library. Among its parameters, elan3_runthread takes a pointer to a procedure fn. Procedure fn performs a local translation of virtual address a and a local read to obtain cbar. After analyzing cbar to determine its owner node, one of two events will occur. If node N1 also owns cbar, then procedure fn will perform a second read and send the value v back to node N0. Otherwise, e.g., if cbar is owned by node Nk, procedure fn initiates the second GET of the GETSQRD operation by initiating another thread on node Nk. That thread is then responsible for sending the end result back to node N0 and for notifying node N0 when the result is available. Those skilled in the art will appreciate that the foregoing example is purely illustrative and that other examples of distributed-memory implementations of indirect load handling, including those which employ hardware other than that of Quadrics Corp., communication libraries other than Elan, and the use (or not) of processors available on NICs, are contemplated herein.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. Various alternatives are also contemplated by exemplary embodiments of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for loading data from at least one memory device pursuant to an indirect load comprising the steps of:
    a first processing unit sending first and second load instructions of the indirect load including an address for the first load instruction to at least one other processing unit for execution by the one other processing unit;
    the at least one other processing unit executing the indirect load by executing the first load instruction loading a first value from a first memory location of said at least one memory device, the first value being returned locally to the at least one processing unit, but not to the first processing unit, and
        determining a second memory location based on said first value for the second load instruction and executing the second load instruction by forwarding the second memory location to the at least one memory device; and
    the first processing unit receiving the second value.

2. The method of claim 1, wherein said first and second memory locations are within the same memory device.

3. The method of claim 2, wherein said at least one other processing unit is a logic unit more local to the at least one memory device than the first processing unit.

4. The method of claim 3, wherein said logic unit is physically packaged together with said same memory device.

5. The method of claim 1, wherein said step of loading said first value from said first memory location further comprises the steps of:
    sending a first virtual address from said first processing unit to a first translation unit;
    translating said first virtual address into a first physical address;
    sending said first physical address to said at least one memory device, and
    returning said first value to said at least one other processing unit.

6. The method of claim 5, wherein said step of determining said second memory location further comprises the step of:
    adding, in said at least one other processing unit, an offset to said first value to determine a second virtual address.

7. The method of claim 6, wherein said step of loading said second value from said second memory location further comprises the steps of:
    translating said second virtual address into a second physical address;
    sending said second physical address to said at least one memory device; and
    returning said second value to said first processing unit.

8. The method of claim 7, wherein said step of translating said second virtual address into a second physical address is performed by a second translation unit.

9. The method of claim 7, wherein said step of translating said second virtual address into a second physical address is performed within said at least one memory device.

10. The method of claim 1, wherein said first processing unit and said at least one other processing unit are first and second nodes, respectively, in a multiprocessor system which communicate with each other via an interconnect device.

11. The method of claim 10, wherein said first memory location is an address owned by a memory unit associated with said second node and wherein said second memory location is an address owned by a memory unit associated with a third node.

12. The method of claim 1 further comprising
    evaluating at least one memory address associated with said indirect load to determine if said at least one memory address is a cache hit or a cache miss; and
    responsive to determining a cache miss, performing the steps of claim 1.

13. A computer-readable medium containing a program for causing a processor to execute a method that performs the steps of:
    at least one other processing unit receiving for execution load instructions of an indirect load including an address for a first load instruction from a first processing unit;
    the at least one other processing unit executing the indirect load by executing the first load instruction loading a first value from a first memory location of at least one memory device, the first value being returned locally to the at least one processing unit, but not to the first processing unit, and
        determining a second memory location based on said first value for a second load instruction and executing the second load instruction by forwarding the second memory location to the at least one memory device; and
    sending the second value to the first processing unit.

14. The computer-readable medium of claim 13, wherein said first and second memory locations are within the same memory device.

15. The computer-readable medium of claim 14, wherein said at least one other processing unit is a logic unit interposed between said first processing unit and said same memory device.

16. The computer-readable medium of claim 15, wherein said logic unit is physically packaged together with said same memory device.

17. The computer-readable medium of claim 13, wherein said step of loading said first value from said first memory location further comprises the steps of:
    sending a first virtual address from said first processing unit to a first translation unit;
    translating said first virtual address into a first physical address;
    sending said first physical address to said at least one memory device, and
    returning said first value to said at least one other processing unit.

18. The computer-readable medium of claim 17, wherein said step of determining said second memory location further comprises the step of:

adding, in said at least one other processing unit, an offset to said first value to determine a second virtual address.

19. The computer-readable medium of claim 18, wherein said step of loading said second value from said second memory location further comprises the steps of:
   translating said second virtual address into a second physical address;
   sending said second physical address to said at least one memory device; and
   returning said second value to said first processing unit.

20. The computer-readable medium of claim 19, wherein said step of translating said second virtual address into a second physical address is performed by a second translation unit.

21. The computer-readable medium of claim 19, wherein said step of translating said second virtual address into a second physical address is performed within said at least one memory device.

22. The computer-readable medium of claim 13, wherein said first processing unit and said at least one other processing unit are first and second nodes, respectively, in multiprocessor system which communicate with each other via an interconnect device.

23. The computer-readable medium of claim 22, wherein said first memory location is an address owned by a memory unit associated with said second node and wherein said second memory location is an address owned by a memory unit associated with a third node.

* * * * *